United States Patent [19]

Spies et al.

[11] 4,039,126
[45] Aug. 2, 1977

[54] THERMOSTATIC REGULATING MEANS FOR AN AIR-CONDITIONING PLANT

[75] Inventors: Volker Spies, Augustenborg; Christian Dyhr-Mikkelsen Poul, Sonderborg; Knud Vagn Valbjørn, Nordborg, all of Denmark

[73] Assignee: Danfoss A/S, Nordborg, Denmark

[21] Appl. No.: 682,179

[22] Filed: Apr. 30, 1976

[30] Foreign Application Priority Data

May 6, 1975 Germany .............................. 2520109

[51] Int. Cl.² ............................................. F24F 11/04
[52] U.S. Cl. ..................................................... 236/42
[58] Field of Search ................. 236/42, 43, 49, 80 R, 236/1 B; 165/261

[56] References Cited

U.S. PATENT DOCUMENTS

| 1,170,834 | 2/1916 | Lovekin ............................. 236/80 R |
| 1,455,662 | 5/1923 | Robertshaw et al. ............. 236/80 R |
| 2,575,042 | 11/1951 | Branson ............................ 236/80 R |
| 3,813,035 | 5/1974 | Wobig ................................ 236/43 X |

Primary Examiner—William E. Wayner
Assistant Examiner—William E. Tapolcai, Jr.

[57] ABSTRACT

The invention relates to a thermostatic regulator assembly which has the dual function of controlling both the heating and air conditioning equipment of a building. The assembly basically incorporates a first valve unit for controlling the flow of a heating fluid such as steam or hot water and a second valve unit for controlling the flow of air which in turn can control the regulator of a damper system of ducts which supply cooled air for air conditioning. The first valve unit is operative when it is open and the second valve unit is operative when it is closed. Thermostatic motor means operate the first and second valve units sequentially so that they are sequentially effective for first and second temperature ranges which correspond to heating and cooling condition requirements. The second valve unit may have a valve seat in the form of a nozzle and a closure member in the form of a baffle plate.

4 Claims, 2 Drawing Figures

THERMOSTATIC REGULATING MEANS FOR AN AIR-CONDITIONING PLANT

The invention relates to thermostatic regulating means for an air-conditioning plant in which air on the one hand and a liquid on the other hand are used as heating and cooling agents, particularly water as a heating agent and air as a cooling agent, and in which a liquid valve is used in the liquid line and a throttle member in the air duct.

It is known to heat a room with warm water radiators and cool it by means of cooled air, the quantity of liquid determined by the liquid valve governing the heat output and the quantity of air determined by the throttle member governing the cooling effect. When the room temperature rises in relation to a set desired value, the throttle member must open with an increase in temperature; when the room temperature falls below the desired value, the liquid valve must open with a fall in temperature.

In the known thermostatic regulating means, external energy such as compressed air, compressed oil or electricity is used to adjust the valves and throttle members.

Thermostatic heater valves are also known in which a thermostat attachment is placed on a valve housing, a thermostatic operating member that is accommodated in the attachment and that can also serve as a temperature senser acting by means of a servo member on the actuating pin of a closure member which is loaded by a return spring. The thermostatic operating member can contain a liquid-steam filling, an adjustable spring for the desired value acting against the steam pressure. However, the thermostatic operating member can also contain a filling of only liquid or only solids.

It is also known to provide in an air duct a throttle member which is adjustable by a pneumatic operating member. In this case a control air line is provided which leads to atmosphere from a pressure source by way of a throttle and a control valve, the pneumatic operating member being connected to the control air line between the throttle and the control valve. As a pressure source, one may use a compressor, a compressed air system or the pressure in the air duct itself. As a control valve it is known for example to use a nozzle covered by a bi-metal.

The invention is based on the object of providing thermostatic requlating means for an air-conditioning plant of the aforementioned kind, which means permit the desired control dependency to be achieved with a simple construction.

This object is achieved according to the invention in that a thermostatic operating member actuates the liquid valve in a first temperature range and in a second temperature range actuates a pressure valve for controlling the pressure in a pneumatic operating member for adjusting the throttle member.

In this arrangement, the force to be exerted by a thermostatic operating member suffices to adjust the control member in addition to the liquid valve because adjustment of the control valve requires only a very small force. Since the two valves are adjusted in different temperature ranges, the desired regulating sequence is obtained in direct dependence on the one thermostatic operating member. The construction is very simple because for the most part conventional components are used and a compact construction is obtained by combining the control valve with the liquid valve.

It is particularly favourable if, upon adjusting the thermostatic operating member in one sense, the liquid valve and the control valve are actuatable in the same sense and the throttle member opens with increased pressure in the pneumatic operating member. Adjustability of the liquid valve and the control valve in different temperature ranges in the same sense facilitates the construction of the combination. Despite this adjustability in the same sense, the desired regulating characteristic is obtained.

The throttle member preferably has a predetermined minimum opening position. This ensures that a certain minimum quantity of air as is required for air exchange will always be supplied.

In a preferred embodiment, the control valve comprises a nozzle as a seat and a preceding baffle plate as a closure member. The pressure in the control pressure line therefore varies as a function of the spacing between the nozzle and baffle plate, extremely small forces being sufficient to adjust the baffle plate.

It is of particular advantage if the closure member of the control valve is, in relation to the seat, held in an open position as predetermined by an abutment by means of a prestressed transmission spring of which the force in the stressed end position exceeds the force of a return spring associated with the closure member of the liquid valve, whilst one of the two control valve parts, e.g. the closure member, is connected to the servo member of the thermostatic operating member and the other of the two control valve parts, e.g. the seat, is connected to the actuating pin of the liquid valve. When, as a result of a temperature rise, the servo member of the thermostatic operating member moves towards the liquid valve, the liquid valve is first of all gradually closed. As soon as its closure member strikes the associated seat, the transmission spring is compressed and subsequently the control valve is gradually closed. One therefore obtains the desired sequence of valve movements in a simple manner.

When using a liquid valve with a thermostat attachment, a spacer should be provided between the housing of the liquid valve and the stationary part of the thermostat attachment and the control valve should be provided within the spacer. Conventional heater valves can then be used and a suitable unit for air-conditioning plant obtained simply by introducing the spacer with control valve.

In this case it is advisable if the control valve comprises a base plate which carries the nozzle at the centre, has a nozzle passage leading to a lateral connecting nipple, forms a supporting surface for the transmission spring outside the nozzle and, further outside, wall portions at the free end of which there is provided an adjustable abutment for the baffle plate loaded by the transmission spring. The control valve then forms a structural unit that can be readily interposed between the servo member of the thermostatic operating member and the actuating pin of the liquid valve.

Desirably, a control air line leads from a pressure source via a throttle and the control valve to atmosphere, the pneumatic operating member being connected to the control air line between the throttle and control valve. In this way the adjusting movement of the control valve can be converted to an adjustment of the throttle member in a simple manner.

If, in addition, the control air line is connected via a constant pressure regulator to the air duct in front of the throttle member, one obtains thermostatic regulating means for an air-conditioning plant that are quite independent from any outside source of power, which reduces the expense of installation.

The invention will now be described in more detail with reference to an example illustrated in the drawing, wherein.

Figure 1:
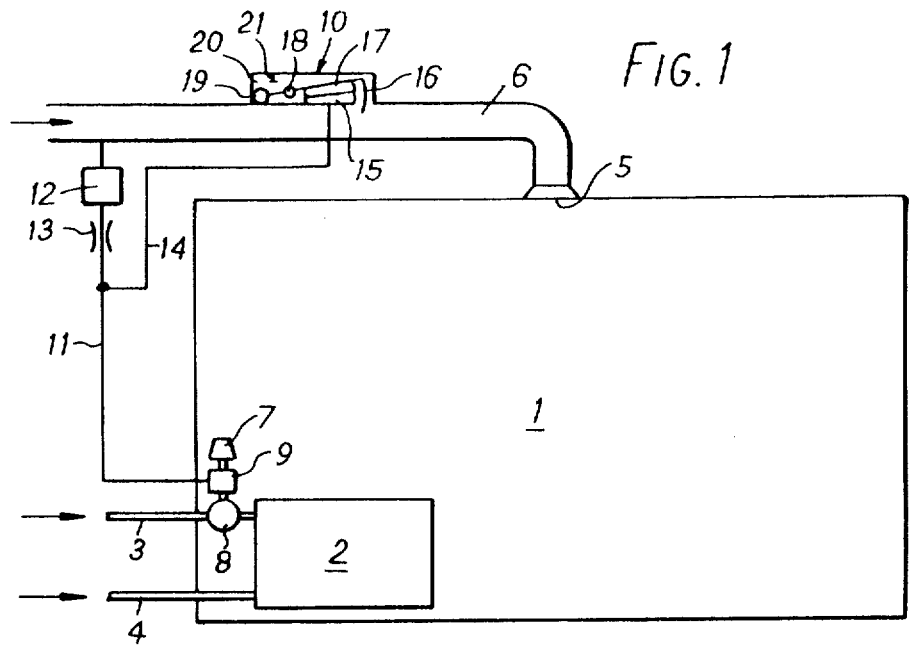
FIG. 1 is a diagrammatic representation of the air-conditioning plant.
Figure 2:
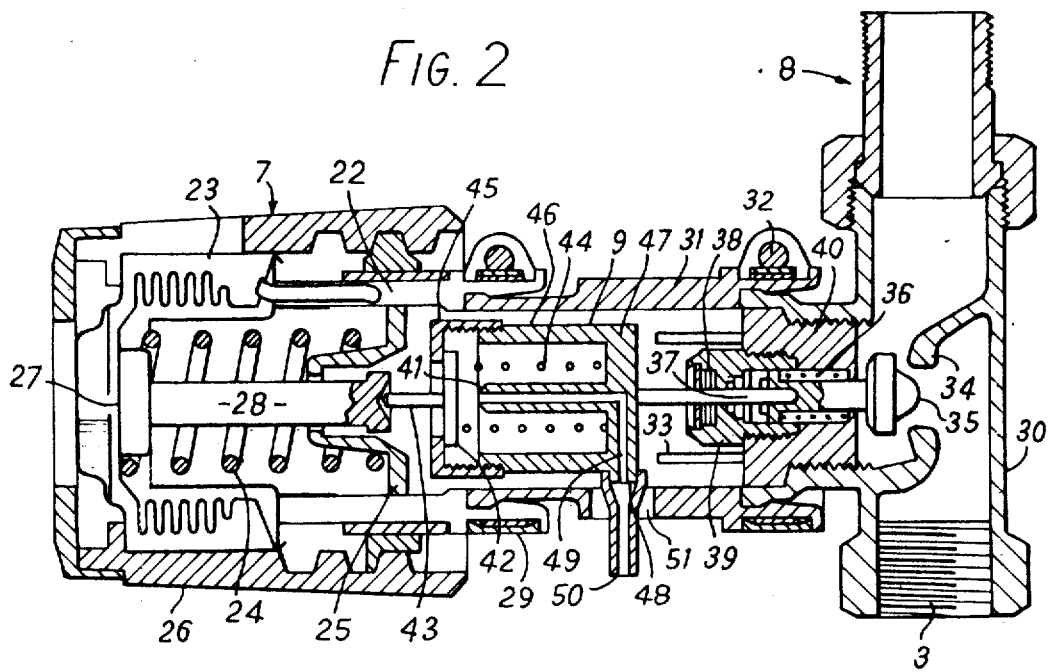
FIG. 2 is a longitudinal section through the thermostat attachment, liquid valve and control valve.

A radiator 2 connected to a hot water supply system by a supply line 3 and a return line 4 is arranged in a room 1. In addition, a blown air inlet aperture 5 is provided which can be supplied with cold air from an air treating installation through an air duct 6.

A thermostat attachment 7 controls a liquid valve 8 in the supply line on the one hand and a control valve 9 on the other hand, a throttle member 10 in the air duct 6 being controlled in dependence on the control valve.

In front of the throttle member 10, a control air line 11 branches off from the air duct 6. In the control air line, a constant pressure regulator 12 in the form of a pressure-reducing valve and a throttle 13 are connected in series. The control air line opens to atmosphere behind the control valve 9. Between the throttle 13 and control valve 9, a second connecting line 14 is branched off, which leads to a pneumatic operating member 15 of the throttle member 10. The throttle member has a cylindrical section 16 connected to a plate 17. The latter can be swung about a pivot point 18 and is relieved by a weight 19. The operating member 15 consists of bellows having a large area and very easily deformable walls, e.g. of polyethylene film. The plate 17 is accommodated in a housing 20 which is connected to atmosphere. An adjustable abutment 21 ensures that a certain minimum opening of the throttle member 10 is maintained even in the absence of pressure in the control air line 11.

The thermostat attachment 7 comprises a stationary member 22 on which there is mounted a thermostatic operating member 23 which at the same time serves as a temperature senser. This operating member has a liquid-steam filling. The steam pressure acts against a desired value spring 24 which is supported against a bridge 25 which can be axially displaced with the aid of a rotary handle 26. A shaft-like servo member 28 is secured to the movable end plate 27 of the operating member 23. Its length depends on the condition of balance between the compression of the desired value spring and the steam pressure in the operating member 23.

The stationary portion 22 of the thermostat attachment 7 can normally be clamped directly to the housing of a value with the aid of a clamping band 29. In the present case a spacer 31 is arranged between this stationary portion 22 and the housing 30 of the value 8, the spacer being clamped to the housing 30 by means of a clamping band 32. For this purpose, the holder, in a manner similar to the stationary portion 22, is provided with slots 33 parallel to the axis.

The liquid valve 8 has a valve seat 34 co-operating with a closure member 35. The latter is under the infuence of a return spring 36 and is actuated by an acutating pin 37 which is passed through seals 38 in an insert 39 of a cover 40.

The control valve 9 is arranged within the spacer 31. As a seat, the control valve has a nozzle 41 and as a closure member a baffle plate 42 which is connected to the servo member 28 of the thermostat attachment 7 by way of a pin 43. Between the two parts there is arranged a prestressed transmission spring 44 which, in a position of rest, exerts a larger force than the return spring 36 in the closed position of the closure member 35. Under the influence of this spring, the baffle plate 42 is pressed against an annular abutment 45 which is adjustably screwed onto a screwthread of a peripheral wall 46. A base plate 47 carries at the centre the nozzle 41, as a nozzle passage 49 leading to a lateral connecting nipple 48, forms a supporting surface for the transmission spring 44 outside the nozzle and further outside carries the peripheral wall portions 46. A flexible tube 50 is placed on the nipple 48; it belongs to the control air line 11 and is led out through a recess 51 in the spacer.

These thermostat requlating means operate in the following manner, it being assumed that the room has a lower temperature than the set desired value temperature. The servo member 28 of the thermostat attachment 7 therefore assumes the illustrated position of equilibrium. Since the prestress of the transmission spring 44 is not exceeded, the entire control valve 9 serves as a rigid coupling. The closure member 35 of the liquid valve 8 is pressed against the actuating pin 37 by the return spring 36. In this way a predetermined quantity of hot water flows through the radiator 2. If the room temperature drops further, the liquid valve 8 opens further; if the temperature rises, this valve will close. Since the control valve 9 is in this case fully open, a very low pressure obtains in the control air line 11. Accordingly, the throttle member 10 remains in its position of minimum opening as predetermined by the abutment 21 and merely facilitates an exchange of air.

If, now, the temperature rises above the desired value temperature, the closure member 35 lies against the seat 34. Further adjustment of the servo member 28 therefore leads to compression of the transmission spring 44 and thus to movement of the baffle plate 42 closer to the nozzle 41. In this way the pressure in the control air line 11 behind the throttle 13 rises, as does the pressure in the pneumatic operating member 15. Consequently the throttle member 10 opens with rising temperature and hence with a rise in control pressure. Colder air is therefore introduced to the room to an increasing extent through the air duct 6. It will be evident that the functions of the liquid valve 8 and the control valve 9 take place in different temperature ranges but in the same sense.

This type of control can also be used in air-conditioning plants where a liquid refrigerant is used and air serves as the heating medium. It is also possible to use the hot water for heating the air supplied in the duct 6 instead of directly heating the room 1. Further, a plurality of radiators 2 can be controlled in the described manner; even a zone control with associated radiators and air inlet apertures is possible.

The operating member 23 can also be controlled by a separate senser. It may also be filled with liquid or with solids.

Instead of the illustrated throttle member 10, one can also use different types, e.g. a conventional slide. Nor need the pressure end of the control air line 11 be connected to the air duct 6; it can be supplied by a different pressure source, e.g. a pressure reservoir, a compressor or a compressed air system.

We claim:

1. A thermostatic regulator assembly comprising a housing, a first valve unit connected to said housing having a first valve seat and a first closure member, first spring means biasing said closure member away from said first valve seat, fluid pressure operated motor means in said housing, said motor means including a servo shaft, a second valve unit having a casing attached to said first closure member and a second closure member attached to said servo shaft, means defining passage means from the exterior of said assembly housing to the interior of said second valve unit casing, said passage means having a second valve seat cooperable with said second closure member, second spring means in said casing biasing said second closure member away from said second valve seat, said second spring means being stiffer than said first spring means so that increasing temperatures cause said first and second valve units to close sequentially with said first valve unit being the first to close.

2. A thermostatic regulator assembly according to claim 1 wherein said increasing temperatures cover first and second ranges, said first valve unit being a liquid control valve which closes at the upper temperature limit of said first range, said second valve unit being an air control valve which closes at the upper temperature limit of said second range.

3. A thermostatic regulator assembly according to claim 1 wherein said second valve seat has the form of a nozzle and said second valve closure member has the form of a baffle plate.

4. A thermostatic regulator assembly according to claim 1 wherein said second spring means bias said second closure member towards an abutting engagement with said casing.

* * * * *